(12) United States Patent
Mitani et al.

(10) Patent No.: US 11,755,114 B2
(45) Date of Patent: Sep. 12, 2023

(54) INPUT DEVICE

(71) Applicant: Panasonic Intellectual Property Management Co., Ltd., Osaka (JP)

(72) Inventors: Takahiro Mitani, Tokyo (JP); Tsuyoshi Tanaka, Kyoto (JP); Hiroyuki Togawa, Osaka (JP); Sho Sonoda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 6 days.

(21) Appl. No.: 17/542,075

(22) Filed: Dec. 3, 2021

(65) Prior Publication Data
US 2022/0197385 A1 Jun. 23, 2022

(30) Foreign Application Priority Data
Dec. 18, 2020 (JP) .................. 2020-210090

(51) Int. Cl.
*G06F 3/0354* (2013.01)
*G06F 3/0488* (2022.01)
*G06F 3/01* (2006.01)

(52) U.S. Cl.
CPC .......... *G06F 3/016* (2013.01); *G06F 3/03547* (2013.01); *G06F 3/0488* (2013.01)

(58) Field of Classification Search
CPC ............ G06F 2203/014; G06F 3/0488; G06F 3/04842; G06F 3/0416; G06F 3/03547; G06F 3/0236; G06F 3/016
See application file for complete search history.

(56) References Cited

U.S. PATENT DOCUMENTS

2020/0192479 A1* 6/2020 Forest ................... G06F 3/016
2020/0278751 A1* 9/2020 Tomaru ................ G06F 3/0482
2021/0055798 A1* 2/2021 Tomaru ................ G06F 3/041

FOREIGN PATENT DOCUMENTS

JP 2018-5706 A 1/2018

* cited by examiner

*Primary Examiner* — Julie Anne Watko
(74) *Attorney, Agent, or Firm* — Seed IP Law Group LLP

(57) ABSTRACT

An input device includes: a touch sensor that detects a position of a touch on an operation surface by an operation finger; a vibration element that vibrates the operation surface; and a controller that changes a magnitude of vibration of the operation surface by the vibration element according to acceleration in movement of the operation finger along the operation surface, the movement being performed while the operation finger is touching the operation surface.

9 Claims, 9 Drawing Sheets

INPUT DEVICE

CROSS REFERENCE TO RELATED APPLICATION

The present application is based on and claims priority of Japanese Patent Application No. 2020-210090 filed on Dec. 18, 2020.

FIELD

The present disclosure relates to an input device that vibrates an operation surface by a vibration element.

BACKGROUND

An input device that includes a display and a touchpad for performing input on a graphical user interface (GUI) displayed on the display has been known. On this type of input device, a user moves his or her operation finger along an operation surface of a touch sensor of the touchpad while the operation finger is touching the operation surface (what is called a sliding operation). In accordance with the operation, a pointer moves on the GUI displayed on the display, for example.

Patent Literature (PTL) 1 discloses an input device that vibrates an operation surface of a touch sensor by an actuator. Vibrating the operation surface of the touch sensor forms an air film called a squeeze film between the operation surface and the operation finger. With this, friction between the operation surface and the operation finger is reduced, and the operation finger slides more smoothly.

Furthermore, when the moving speed of the sliding operation by the operation finger is less than a threshold, the input device disclosed in PTL 1 determines that a user is trying to stop the pointer in an icon area of a GUI, and stops vibration of the operation surface of the touch sensor. With this, the friction between the operation surface and the operation finger is changed from a low level to a high level. Consequently, the user can easily stop the operation finger on the operation surface, and therefore the user can easily stop the pointer in the icon area of the GUI.

CITATION LIST

Patent Literature

PTL 1: Japanese Unexamined Patent Application Publication No. 2018-5706

SUMMARY

However, the input device according to PTL 1 can be improved upon.

In view of this, the present disclosure provides an input device capable of improving upon the above related art.

The input device according to one aspect of the present disclosure includes: a touch sensor that detects a position of a touch on an operation surface by an operation body; a vibration element that vibrates the operation surface; and a controller that changes a magnitude of vibration of the operation surface by the vibration element according to acceleration in movement of the operation body along the operation surface, the movement being performed while the operation body is touching the operation surface.

Note that these comprehensive or specific aspects may be implemented as a system, a method, an integrated circuit, a computer program, or a computer-readable recording medium such as a compact disc-read only memory (CD-ROM), or may be implemented as any combination of systems, methods, integrated circuits, computer programs, and recording media.

An input device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
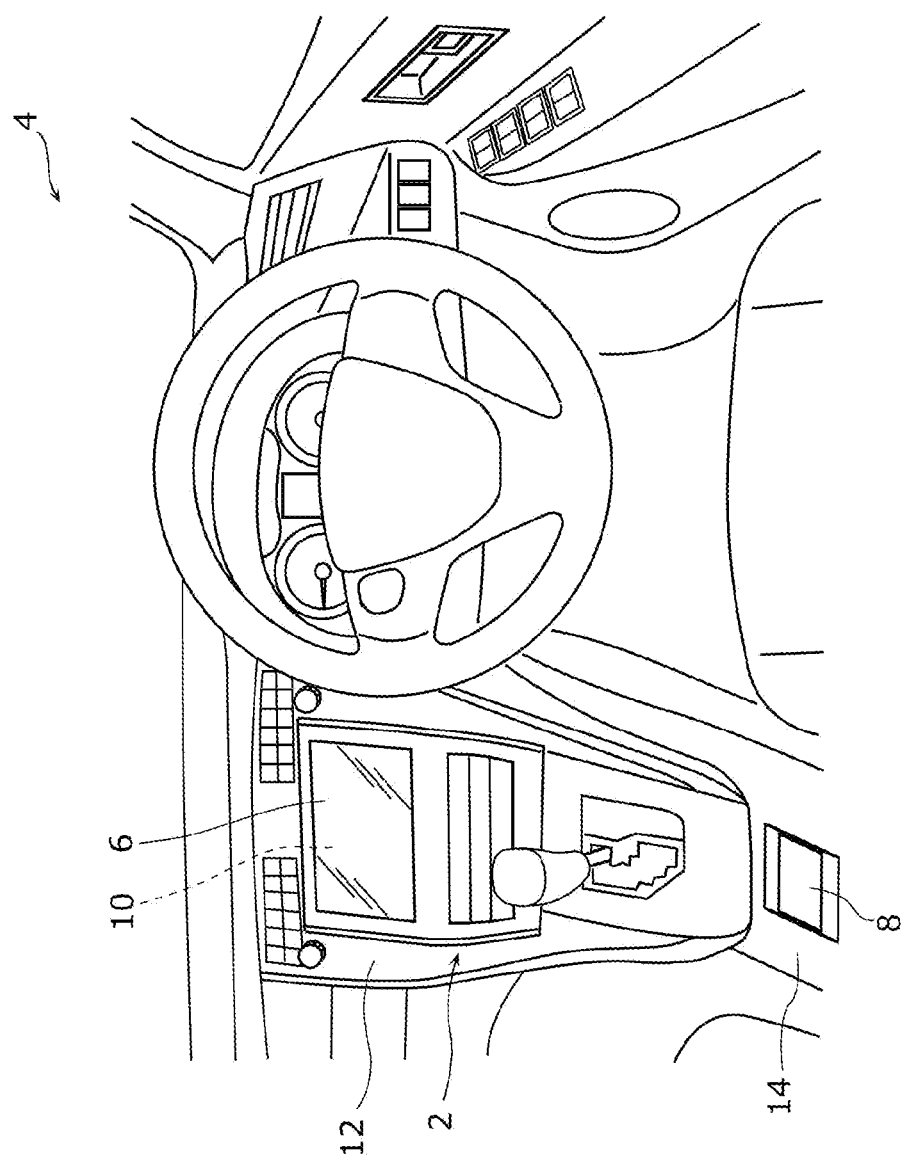
FIG. 1 is a diagram illustrating an example of an interior of a vehicle including an input device according to an embodiment.

DESCRIPTION OF EMBODIMENT (Underlying Knowledge Forming the Basis of the Disclosure)

The inventors have found the following problem occurs in the input device described in the "Background".

Generally, the above-described input device has a display and a touchpad that are physically separated from each other. Therefore, it is difficult for a user to intuitively know how much a pointer will move on a GUI displayed on the display in response to the user moving an operation finger a certain amount on the operation surface of the touchpad. As a result, when the pointer approaches an icon area of the GUI, a user tends to increase and decrease the moving speed of the operation finger little by little while slowly decreasing the moving speed of the operation finger (what is called a hesitating motion).

However, in the input device disclosed in PTL 1, the friction between the operation surface and the operation finger cannot be controlled to follow change in the moving speed of the operation finger during such a hesitating motion. Therefore, operability decreases.

To solve such a problem, an input device according to one aspect of the present disclosure includes: a touch sensor that detects a position of a touch on an operation surface by an operation body; a vibration element that vibrates the operation surface; and a controller that changes a magnitude of vibration of the operation surface by the vibration element according to acceleration in movement of the operation body along the operation surface, the movement being performed while the operation body is touching the operation surface.

With this aspect, when the operation body moves along the operation surface while the operation body is touching the operation surface, the controller changes the magnitude of vibration of the operation surface by the vibration element according to the acceleration in movement of the operation body. With this, the friction between the operation body and the operation surface can be controlled to follow change in the moving speed of the operation body. As a result, operability can be enhanced and operation time can be reduced.

For example, the controller may calculate the acceleration in movement of the operation body, based on a result of detection by the touch sensor.

With this aspect, the controller can easily calculate the acceleration in movement of the operation body using a result of the detection by the touch sensor.

For example, the controller may: calculate the acceleration in movement of the operation body using change in the position of the touch per unit time, the position of the touch being detected by the touch sensor; and apply a driving voltage to the vibration element to decrease the magnitude of vibration of the operation surface by the vibration element as the acceleration in movement calculated increases.

With this aspect, the controller applies a smaller driving voltage to the vibration element as the acceleration in movement of the operation body increases, so that the magnitude of the vibration on the operation surface by the vibration element decreases as the acceleration in movement of the operation body increases. Accordingly, friction between the operation body and the operation surface increases as the acceleration in movement of the operation body increases. This helps the operation body not to slip easily. In contrast, friction between the operation body and the operation surface decreases as the acceleration in movement of the operation body decreases. This helps the operation body to slide more easily. As a result, operability can be enhanced and operation time can be reduced.

For example, the controller may: determine, using a first relation, a driving voltage corresponding to the acceleration in movement calculated, the first relation being a relation in which the driving voltage to be applied to the vibration element decreases at a constant rate relative to increase in the acceleration in movement; and apply the driving voltage determined to the vibration element.

With this aspect, the controller can easily determine a driving voltage corresponding to the calculated acceleration in movement, using the first relation.

For example, the controller may: determine, using a second relation, a driving voltage corresponding to the acceleration in movement calculated, the second relation being a relation in which the driving voltage to be applied to the vibration element decreases at a rate that decreases as the acceleration in movement increases; and apply the driving voltage determined to the vibration element.

With this aspect, the controller can easily determine a driving voltage corresponding to the calculated acceleration in movement, using the second relation.

For example, the input device described above may further include: a display that displays content that is input to the touch sensor by the operation body.

With this aspect, the touch sensor of the input device can be used as a touchpad. With this, even if a hesitating motion occurs during a sliding operation by the operation body, the friction between the operation body and the operation surface can be controlled to follow change in the moving speed of the operation body during the hesitating motion. As a result, operability can be enhanced and operation time can be reduced.

For example, the controller may: calculate a moving speed of the operation body based on the change in the position of the touch per unit time, the position of the touch being detected by the touch sensor; and calculate the acceleration in movement based on change per unit time in the moving speed calculated.

With this aspect, the acceleration in movement can be calculated easily.

For example, when the moving speed calculated is greater than a threshold, the controller may apply the driving voltage to the vibration element to decrease the magnitude of vibration of the operation surface by the vibration element as the acceleration in movement calculated increases.

With this aspect, the vibration element can be controlled accurately.

For example, when the moving speed calculated is less than or equal to the threshold, the controller may stop driving the vibration element.

With this aspect, the vibration element can be controlled accurately.

Note that these comprehensive or specific aspects may be implemented as a system, a method, an integrated circuit, a computer program, or a computer-readable recording medium such as a CD-ROM, or may be implemented as any combination of systems, methods, integrated circuits, computer programs, and recording media.

The following specifically describes an embodiment with reference to the drawings.

Note that the embodiment described below is merely a comprehensive or specific example. The numerical values, shapes, materials, structural components, arrangement and connection of the structural components, steps, order of the steps, etc., indicated in the following embodiment are given merely by way of illustration and are not intended to limit the present disclosure. Furthermore, among structural components in the following embodiment, those not recited in any one of the independent claims defining the broadest inventive concept are described as optional structural components.

EMBODIMENT

1. Overview of Input Device

Figure 2:
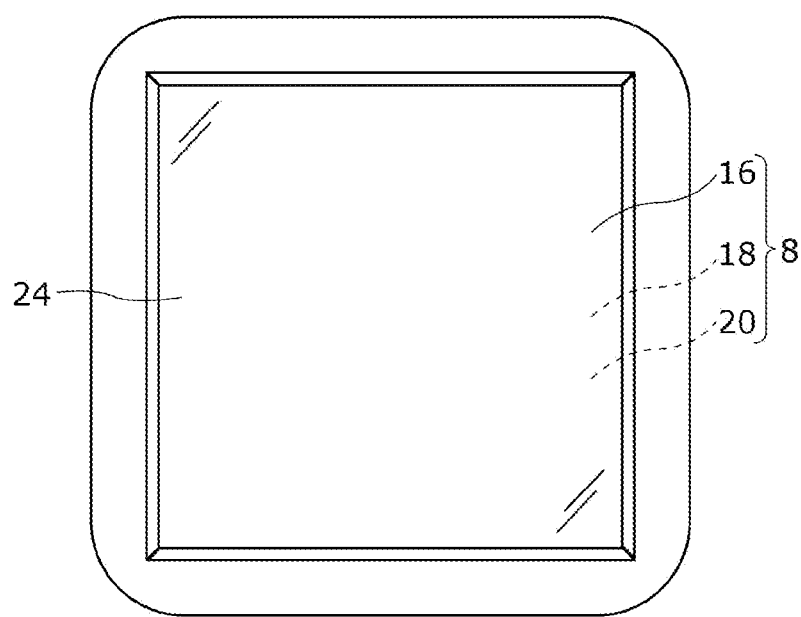
FIG. 2 is a front view of a touchpad of the input device according to the embodiment.

First, an overview of input device 2 according to an embodiment will be described with reference to FIG. 1 and FIG. 2. FIG. 1 is a diagram illustrating an example of an interior of vehicle 4 including input device 2 according to the embodiment. FIG. 2 is a front view of touchpad 8 of input device 2 according to the embodiment.

As illustrated in FIG. 1, input device 2 according to the embodiment is provided in the interior of vehicle 4, such as an automobile, for example. Input device 2 is a device for operating various types of in-vehicle devices, such as a car navigation device, an audio device, or an air-conditioning device provided in vehicle 4. Input device 2 includes display 6 and touchpad 8.

Display 6 is, for example, a display that displays graphical user interface (GUI) 10 that allows operation of a map for car navigation, a menu screen, a search screen, or the like of various types of in-vehicle devices. Display 6 is disposed, for example, on instrument panel 12 of vehicle 4. Display 6 may include a liquid crystal display, an organic electroluminescence display, or other types of displays. Note that GUI 10 is not illustrated in FIG. 1 for convenience of description.

Touchpad 8 is an input interface for receiving input to GUI 10 displayed on display 6. Touchpad 8 is disposed on center console 14 in vehicle 4, for example. A user can operate various types of in-vehicle devices by performing input to GUI 10 using touchpad 8. As illustrated in FIG. 2, touchpad 8 includes touch sensor 16, pressure-sensitive sensor 18, and vibration element 20.

On a front-surface side of touch sensor 16, operation surface 24 is formed. Operation surface 24 is where operation finger 22 of a user (see (b) in FIG. 4, which will be described later) touches as an operation body. Touch sensor 16 is a capacitive touch sensor that detects a position of a touch on operation surface 24 by operation finger 22. Touch sensor 16 detects, for example, an operation that operation finger 22 moves along operation surface 24 while operation finger 22 is touching operation surface 24 (hereafter referred to as "sliding operation"). Note that in the present embodiment, operation finger 22 touches operation surface 24, but this should be not construed as limiting. For example, a touch pen or other objects may touch operation surface 24 as an operation body.

Pressure-sensitive sensor 18 is disposed to overlap a back-surface side of touch sensor 16, and detects press-down input that is performed by pressing down operation surface 24 of touch sensor 16. Note that the press-down input detected by pressure-sensitive sensor 18 is received as input indicating "enter", for example.

Vibration element 20 is disposed on the back-surface side of touch sensor 16. Vibration element 20 is, for example, an actuator that is driven when a driving voltage is applied. Vibration element 20 vibrates when being driven, and vibration of vibration element 20 is transmitted to operation surface 24 of touch sensor 16. With this, vibration element 20 vibrates operation surface 24 of touch sensor 16 at a predetermined frequency (for example, from 100 Hz to 200 Hz), and presents a tactile sense to operation finger 22 touching operation surface 24. Note that operation surface 24 of touch sensor 16 is vibrated by vibration element 20 in a direction perpendicular to operation surface 24, for example. However, this should not be construed as limiting. Operation surface 24 may be vibrated in any direction. Furthermore, vibration element 20 may have a configuration that vibrates in an ultrasonic wave band to present a tactile sense to operation finger 22 touching operation surface 24.

When operation surface 24 of touch sensor 16 is vibrated by vibration element 20, friction between operation finger 22 and operation surface 24 during a sliding operation is less than friction during the sliding operation when operation surface 24 is not vibrated. Accordingly, when operation surface 24 of touch sensor 16 is vibrated by vibration element 20, operation finger 22 slides on operation surface 24 more easily than when operation surface 24 is not vibrated.

Moreover, friction between operation finger 22 and operation surface 24 during the sliding operation is adjusted by adjusting magnitude (amplitude) of vibration of operation surface 24 of touch sensor 16 by vibration element 20. Specifically, friction between operation finger 22 and operation surface 24 during the sliding operation decreases as the magnitude of vibration of operation surface 24 of touch sensor 16 by vibration element 20 increases, and operation finger 22 slides on operation surface 24 more easily.

2. Functional Configuration of Input Device

Figure 3:
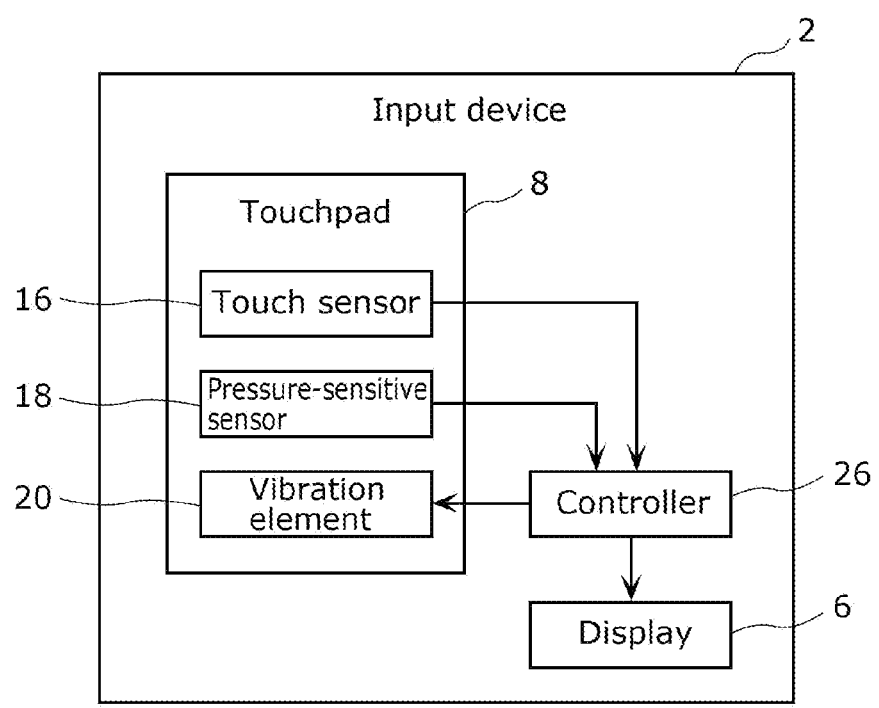
FIG. 3 is a block diagram illustrating a functional configuration of the input device according to the embodiment.
Figure 4:
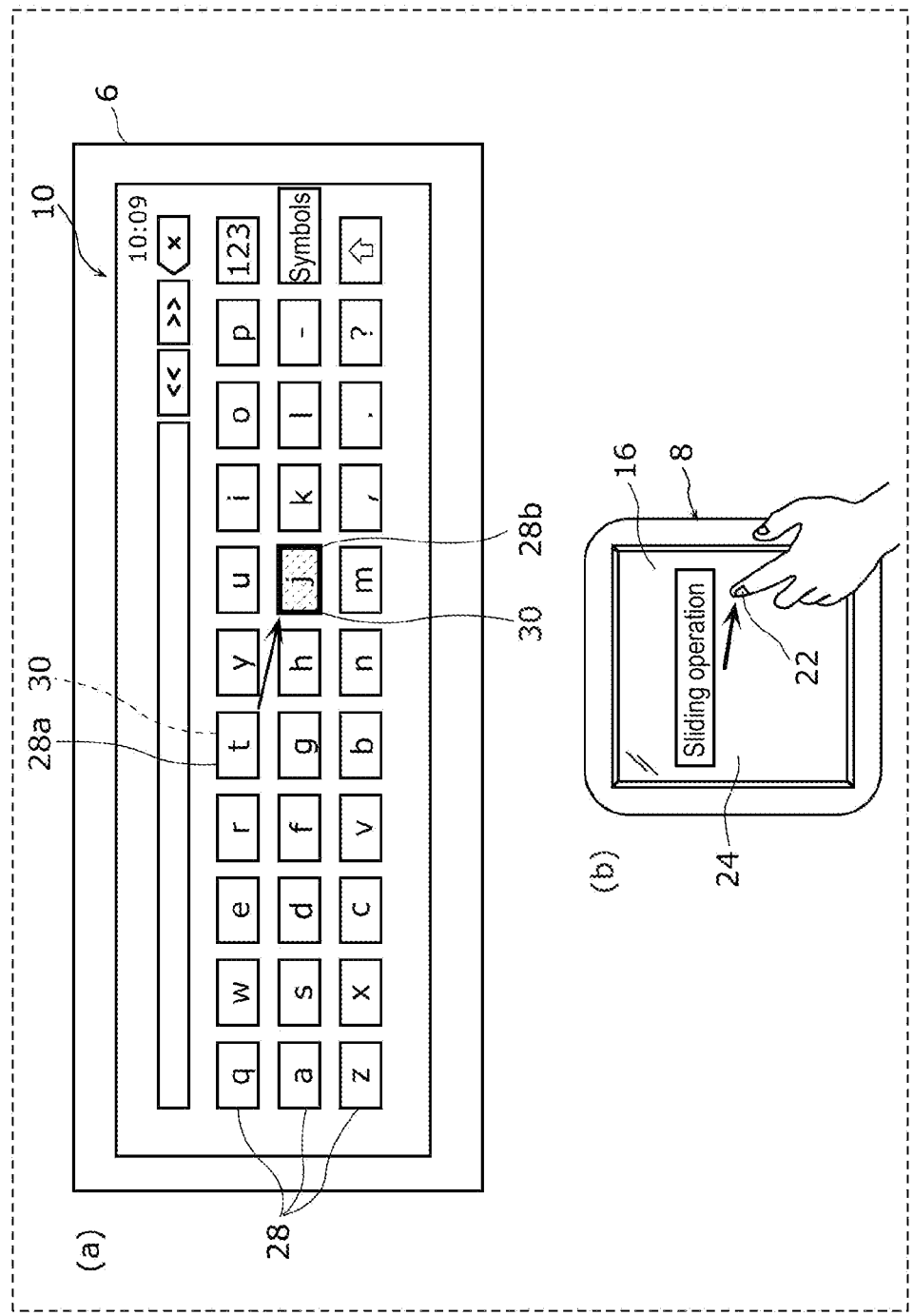
FIG. 4 is a diagram illustrating an example of a sliding operation on the input device according to the embodiment.
Figure 5:
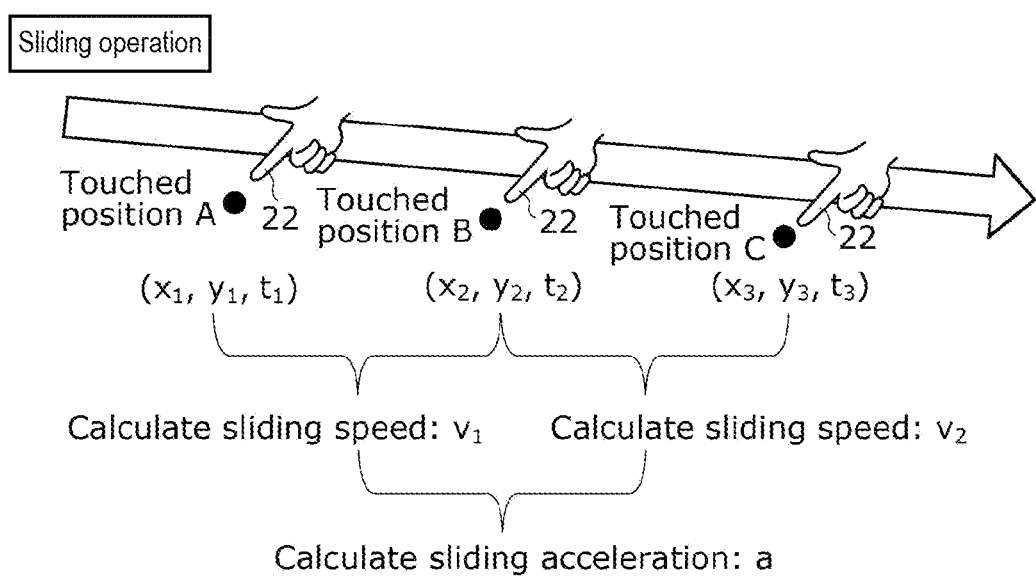
FIG. 5 is a diagram for illustrating an example of a method of calculating sliding acceleration by a controller of the input device according to the embodiment.
Figure 6:
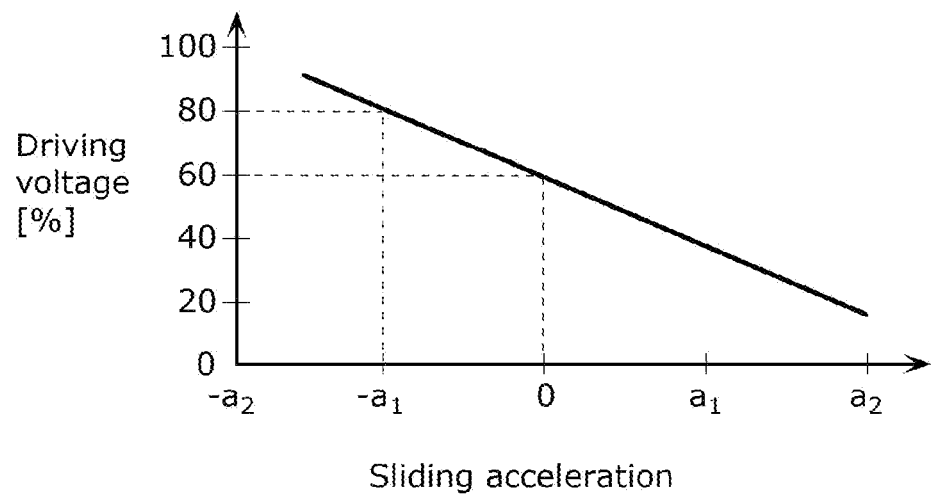
FIG. 6 is a graph showing an example of a first relation between the sliding acceleration and a driving voltage to be applied to a vibration element.
Figure 7:
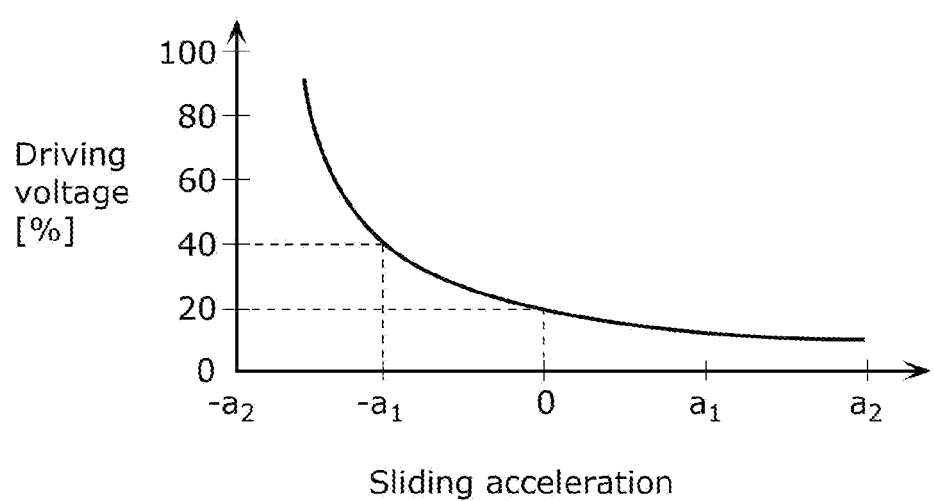
FIG. 7 is a graph showing an example of a second relation between the sliding acceleration and the driving voltage to be applied to the vibration element.

Next, a functional configuration of input device 2 according to the embodiment will be described with reference to FIG. 3 through FIG. 7. FIG. 3 is a block diagram illustrating a functional configuration of input device 2 according to the embodiment. FIG. 4 is a diagram illustrating an example of a sliding operation on input device 2 according to the embodiment. FIG. 5 is a diagram for illustrating an example of a method of calculating sliding acceleration by controller 26 of input device 2 according to the embodiment. FIG. 6 is a graph showing an example of a first relation between the sliding acceleration and a driving voltage to be applied to vibration element 20. FIG. 7 is a graph showing an example of a second relation between the sliding acceleration and the driving voltage to be applied to vibration element 20.

As illustrated in FIG. 3, input device 2 includes display 6, touchpad 8, and controller 26 as a functional configuration.

Touch sensor 16 of touchpad 8 outputs, to controller 26, a detection signal indicating a position of a touch on operation surface 24 by operation finger 22. Moreover, pressure-sensitive sensor 18 of touchpad 8 outputs, to controller 26, a detection signal indicating that touch sensor 16 has detected the press-down input on operation surface 24.

Controller 26 causes display 6 to display GUI 10 for operating various types of in-vehicle devices. For example, as illustrated in (a) in FIG. 4, controller 26 causes display 6 to display GUI 10 showing a keyboard layout to be used as, for example, a search screen for receiving input of a destination into a car navigation device. In the example illustrated in (a) in FIG. 4, the keyboard layout of GUI 10 is a QWERTY layout for inputting alphabets. GUI 10 includes a plurality of character input keys 28 and other keys to receive input of characters (alphabets).

Moreover, controller 26 changes GUI 10 displayed on display 6 based on each detection signal from touch sensor 16 and pressure-sensitive sensor 18 of touchpad 8. Specifically, as illustrated in (a) in FIG. 4, controller 26 causes GUI 10 to display pointer 30 when operation finger 22 has touched operation surface 24 of touch sensor 16. Moreover, when touch sensor 16 detects a sliding operation of operation finger 22, controller 26 moves pointer 30 on GUI 10 according to a direction and amount of movement of operation finger 22 during the sliding operation.

For example, as illustrated in (b) in FIG. 4, when touch sensor 16 detects movement of operation finger 22 to the lower right on operation surface 24 during the sliding operation, controller 26 links the movement direction of operation finger 22 with the movement direction of pointer 30 and moves pointer 30 to the lower right on GUI 10 as illustrated in (a) in FIG. 4. In the example illustrated in (a) in FIG. 4, pointer 30 is moved from a position of character input key 28*a* corresponding to the letter "t" to a position of character key 28*b* corresponding to the letter "j". Note that input of the letter "j" is entered when a user presses down operation finger 22 on operation surface 24 when pointer 30 overlaps character input key 28*b*.

Moreover, controller 26 calculates acceleration in movement of operation finger 22 (hereafter referred to as "sliding acceleration") during the sliding operation based on a detection signal from touch sensor 16. With reference to FIG. 5, the following describes an example of a method of calculating the sliding acceleration by controller 26.

Controller 26 calculates coordinates of a position of a touch on operation surface 24 by operation finger 22 based on a detection signal from touch sensor 16. In the example illustrated in FIG. 5, when operation finger 22 moves from touched position A, through touched position B, to touched position C by the sliding operation, controller 26 calculates coordinates of touched position A ($x_1$, $y_1$), coordinates of touched position B ($x_2$, $y_2$), and coordinates of touched position C ($x_3$, $y_3$). Note that coordinates of the touched positions calculated by controller 26 are coordinates in an XY coordinates system in which the origin is the center of operation surface 24, the X axis is in a lateral direction of operation surface 24 (horizontal direction in FIG. 2), and the Y axis is in a longitudinal direction of operation surface 24 (vertical direction in FIG. 2), for example. Furthermore, it is assumed that the times at which touch sensor 16 has detected touched position A, touched position B, and touched position C are $t_1$, $t_2$, and $t_3$ ($t_1 < t_2 < t_3$), respectively.

Controller 26 calculates a moving speed of operation finger 22 during the sliding operation (hereafter referred to as "sliding speed") based on an amount of change per unit time between positions of touches on operation surface 24 by operation finger 22. In the example illustrated in FIG. 5, controller 26 calculates sliding speed $v_1$, which is a speed of operation finger 22 moving from touched position A to touched position B, based on an amount of displacement between the coordinates ($x_1$, $y_1$) of touched position A and the coordinates ($x_2$, $y_2$) of touched position B per frame ($t_2 - t_1$). Moreover, controller 26 calculates sliding speed $v_2$, which is a speed of operation finger 22 moving from touched position B to touched position C, based on an amount of displacement between the coordinates ($x_2$, $y_2$) of touched position B and the coordinates ($x_3$, $y_3$) of touched position C per frame ($t_3 - t_2$).

Lastly, controller 26 calculates sliding acceleration "a", based on an amount of change ($v_2 - v_1$) per unit time between the calculated sliding speeds $v_1$ and $v_2$. Note that when the calculated sliding acceleration "a" is a positive number, this means that operation finger 22 is moving on operation surface 24 with acceleration. When the calculated sliding acceleration "a" is a negative number, this means that operation finger 22 is moving on operation surface 24 with deceleration. When the calculated sliding acceleration "a" is 0 (zero), this means that operation finger 22 is moving on operation surface 24 at an equal speed.

Moreover, controller 26 controls vibration element 20 such that the magnitude of vibration of operation surface 24 of touch sensor 16 by vibration element 20 is changed according to the calculated acceleration in movement. In other words, controller 26 applies a smaller driving voltage to vibration element 20 as the calculated acceleration in movement increases, so that the magnitude of vibration of operation surface 24 by vibration element 20 decreases as the calculated acceleration in movement increases. Moreover, controller 26 applies a larger driving voltage to vibration element 20 as the calculated acceleration in movement decreases, so that the magnitude of vibration of operation surface 24 by vibration element 20 increases as the calculated acceleration in movement decreases.

Specifically, controller 26 determines a driving voltage corresponding to the calculated sliding acceleration using a first relation as shown in FIG. 6, and applies the determined driving voltage to vibration element 20. The first relation is a correspondence relation between sliding acceleration and a driving voltage to be applied to vibration element 20. In the first relation, the driving voltage to be applied to vibration element 20 decreases at a constant rate relative to increase in the sliding acceleration. Data indicating the first relation is stored in memory (not illustrated) of input device 2 in advance. As shown in FIG. 6, for example, when the calculated sliding acceleration is "$-a_1$" ($a_1 > 0$), controller 26 determines that the driving voltage corresponding to the sliding acceleration "$-a_1$" is "80%" by referring to the first relation. Moreover, for example, when the calculated sliding acceleration is "0", controller 26 determines that the driving voltage corresponding to the sliding acceleration "0" is "60%" by referring to the first relation. Note that as the driving voltage to be applied to vibration element 20 increases from 0% to 100%, vibration of vibration element 20 gradually increases.

Instead of such a configuration, controller 26 may determine a driving voltage corresponding to the calculated sliding acceleration using a second relation as shown in FIG. 7, and apply the determined driving voltage to vibration element 20. The second relation is a correspondence relation between a sliding acceleration and a driving voltage to be applied to vibration element 20. In the second relation, the driving voltage to be applied to vibration element 20 decreases at a rate that decreases as the sliding acceleration increases. Data indicating the second relation is stored in the memory of input device 2 in advance. As shown in FIG. 7, for example, when the calculated sliding acceleration is "$-a_1$", controller 26 determines that the driving voltage corresponding to the sliding acceleration "$-a_1$" is "40%" by referring to the second relation. Moreover, for example, when the calculated sliding acceleration is "0", controller 26 determines that the driving voltage corresponding to the sliding acceleration "0" is "20%" by referring to the second relation.

Note that controller 26 may include, for example, a processor that executes a predetermined program and memory that stores the predetermined program, or may include a dedicated circuit. Other than the above, controller 26 may include, for example, an electronic control unit (ECU) provided in vehicle 4.

3. Operation of Input Device

Figure 8:
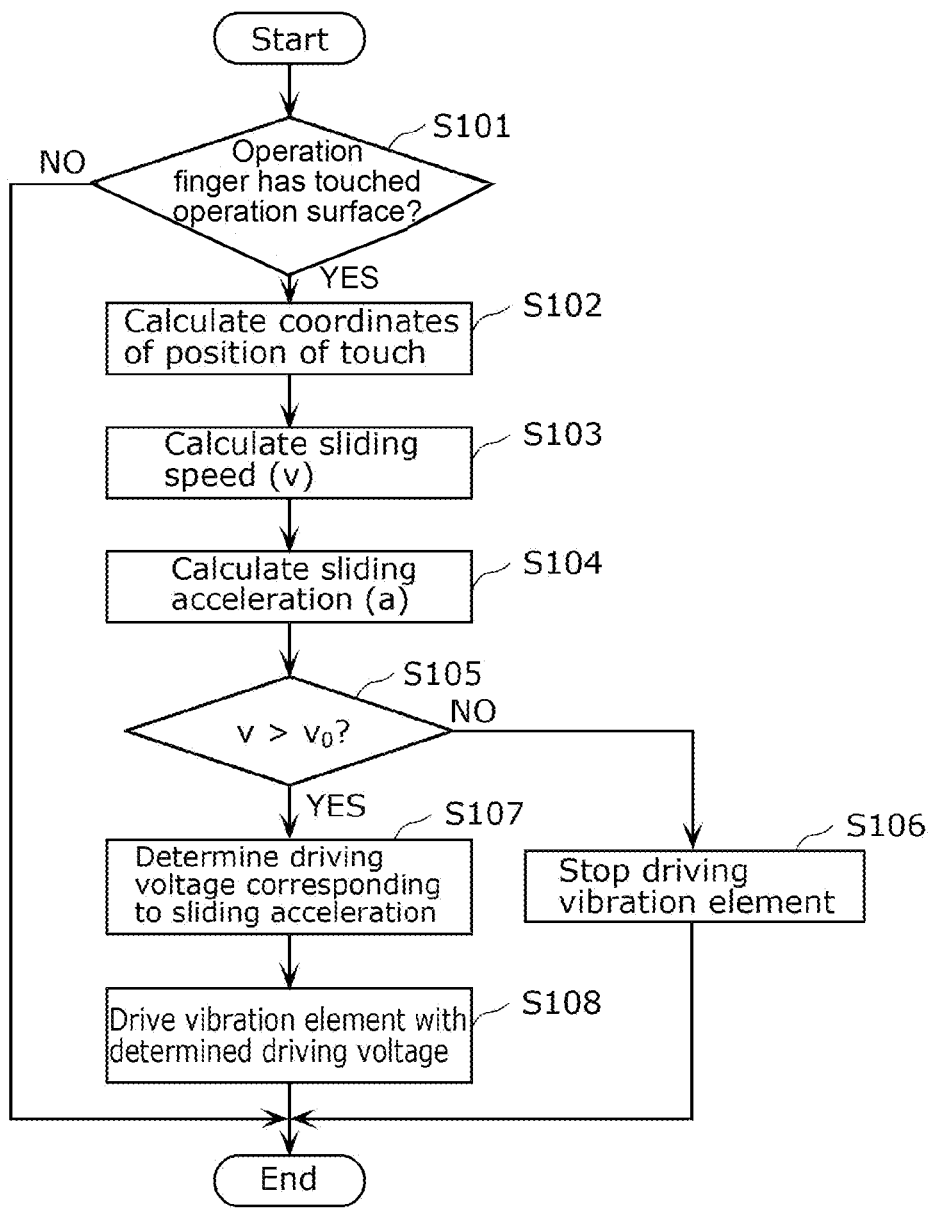
FIG. 8 is a flowchart of an operational flow of the input device according to the embodiment.

Next, operations of input device 2 according to the embodiment will be described with reference to FIG. 8. FIG. 8 is a flowchart of an operational flow of input device 2 according to the embodiment.

As illustrated in FIG. 8, first, touch sensor 16 of touchpad 8 determines whether operation finger 22 has touched operation surface 24 (S101). When operation finger 22 has not touched operation surface 24 (NO in S101), touch sensor 16 ends the process.

When operation finger 22 has touched operation surface 24 (YES in S101), touch sensor 16 outputs, to controller 26, a detection signal indicating a position of a touch on operation surface 24 by operation finger 22. Controller 26 calculates coordinates of the position of the touch on operation surface 24 by operation finger 22, based on the detection signal from touch sensor 16 (S102).

Controller 26 calculates sliding speed v of operation finger 22 based on an amount of change per unit time between the positions of touches on operation surface 24 by operation finger 22 (S103). Controller 26 calculates sliding acceleration "a", based on an amount of change in the calculated sliding speed per unit time (S104).

Controller 26 determines whether the sliding speed v calculated in step S103 is greater than threshold $v_0$ (S105). When the calculated sliding speed v is less than or equal to threshold $v_0$ (NO in S105), controller 26 determines that a user has not yet started a sliding operation, stops driving vibration element 20 (S106), and ends the process.

In contrast, when the calculated sliding speed v is greater than threshold $v_0$ (YES in S105), controller 26 determines that a user has started a sliding operation, and refers to the first relation shown in FIG. 6 (or the second relation shown in FIG. 7) to determine a driving voltage corresponding to the sliding acceleration "a" calculated in step S104 (S107). Controller 26 applies the determined driving voltage to vibration element 20 to drive vibration element 20 (S108), and ends the process.

Operation surface 24 of touch sensor 16 vibrates when vibration element 20 is driven. With this, friction between operation finger 22 and operation surface 24 during a sliding operation is less than the friction during a sliding operation when operation surface 24 is not vibrated. Accordingly, when operation surface 24 of touch sensor 16 is vibrated by vibration element 20, operation finger 22 slides on operation surface 24 more easily than when operation surface 24 is not vibrated.

4. Effects

Figure 9:
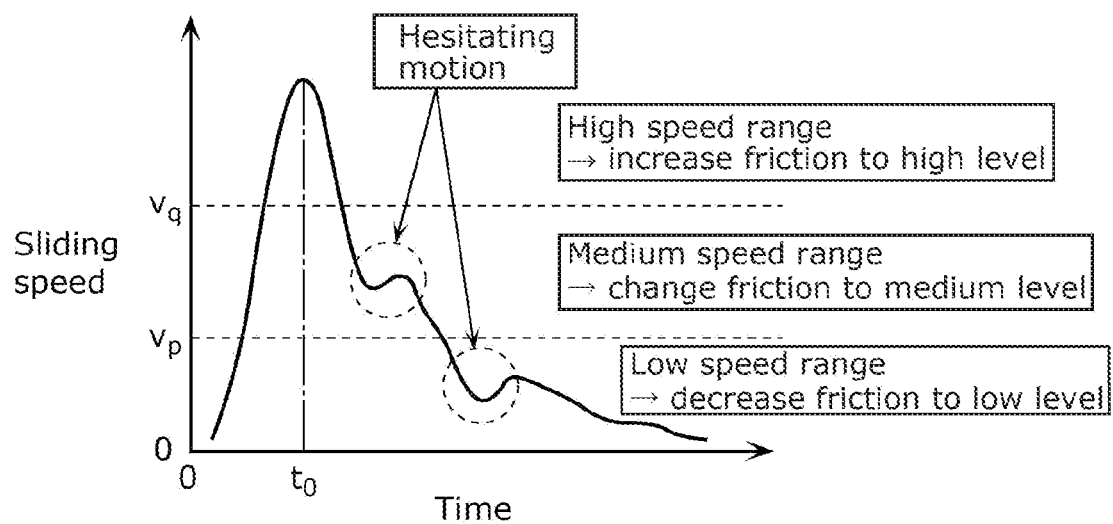
FIG. 9 is a diagram for illustrating a method of controlling vibration of an operation surface of a touch sensor of an input device according to a comparison example.

Here, with reference to FIG. 9, a method of controlling vibration of an operation surface of a touch sensor in an input device according to a comparison example will be described. FIG. 9 is a diagram for illustrating a method of controlling vibration of the operation surface of the touch sensor in the input device according to the comparison example.

As illustrated in FIG. 9, it has been generally known that when a user performs a sliding operation on an input device, the sliding speed of the operation finger increases rapidly, then decreases at time to, and after that, the sliding speed gradually decreases.

As illustrated in FIG. 9, in the input device according to the comparison example, when the sliding speed is a speed in a low speed range that is a speed less than threshold $v_p$, the vibration element is controlled such that the magnitude of vibration of the operation surface of the touch sensor is increased to the highest level. With this, friction between the operation finger and the operation surface is decreased to the lowest level.

Furthermore, in the input device according to the comparison example, when the sliding speed is a speed in a medium speed range that is a speed greater than or equal to threshold $v_p$ and less than or equal to threshold $v_q$ ($v_p<v_q$), the vibration element is controlled such that the magnitude of vibration of the operation surface of the touch sensor is changed to an approximately medium level. With this, friction between the operation finger and the operation surface becomes approximately at a medium level.

Moreover, in the input device according to the comparison example, when the sliding speed is a speed in a high speed range that is a speed greater than threshold $v_q$, the vibration element is controlled such that the magnitude of vibration of the operation surface of the touch sensor is decreased to the lowest level. With this, friction between the operation finger and the operation surface is increased to the highest level.

Generally, an input device has a display and a touchpad that are physically separated from each other. Therefore, it is difficult for a user to intuitively know how much a pointer will move on a GUI displayed on the display in response to the user moving an operation finger a certain amount on the operation surface of the touchpad. As a result, when the pointer approaches an icon area of the GUI, a user tends to increase and decrease the moving speed of the operation finger little by little while slowly decreasing the moving speed of the operation finger (hereafter referred to as a hesitating motion).

However, in the input device according to the comparison example, the friction between the operation finger and the operation surface cannot be controlled to follow change in the moving speed of the operation finger during such a hesitating motion. For example, as illustrated in FIG. 9, when the sliding speed is in the medium speed range or the low speed range, friction between the operation finger and the operation surface does not change even at a timing when the hesitating motion of the operation finger occurs. As a result, the operability decreases and the operation time becomes longer.

To solve the above, in input device 2 according to the embodiment, controller 26 applies a smaller driving voltage to vibration element 20 as the calculated acceleration in movement of operation finger 22 increases, so that the magnitude of vibrating operation surface 24 by vibration element 20 decreases as the calculated acceleration in movement of operation finger 22 increases.

Figure 10:
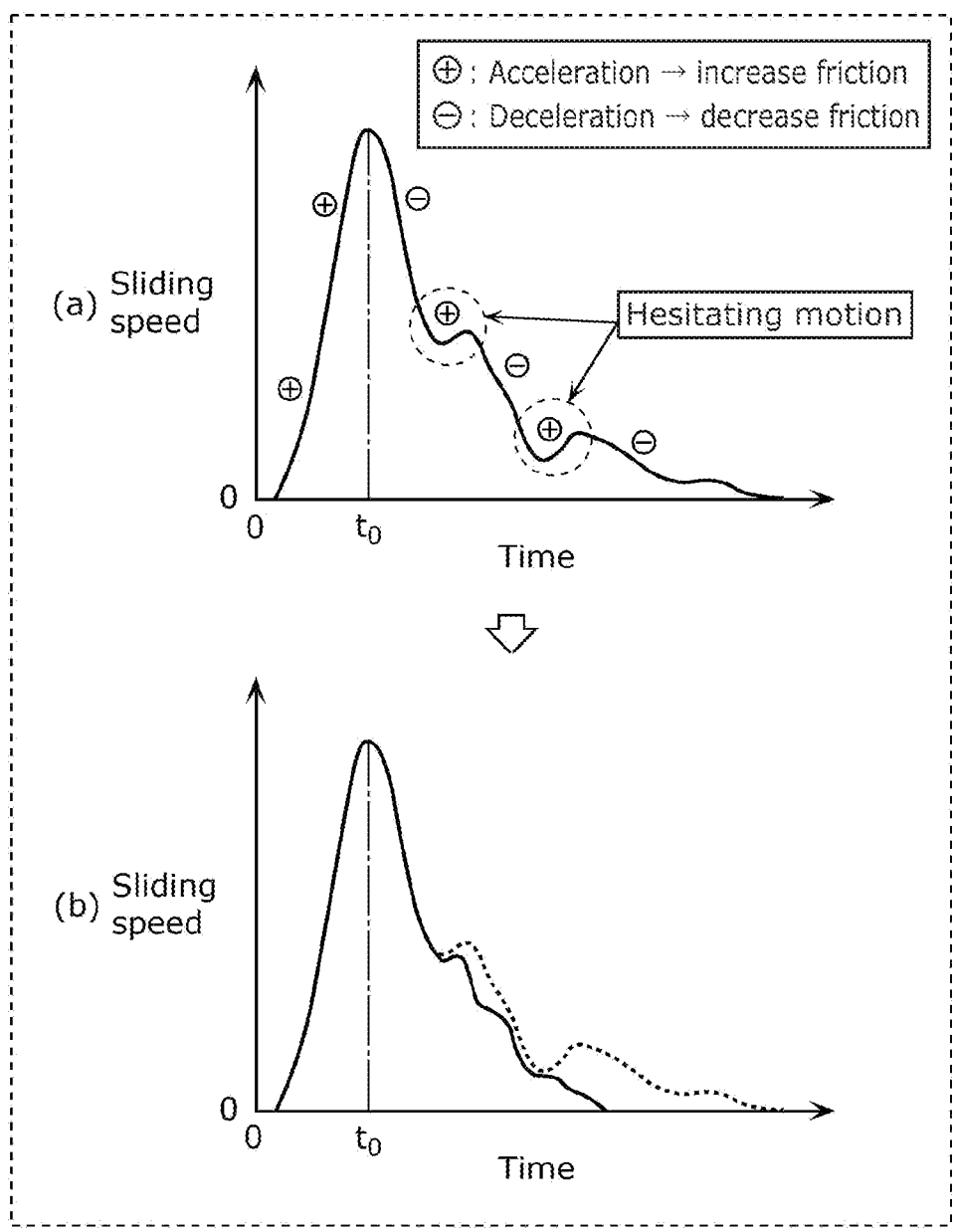
FIG. 10 is a diagram for illustrating a method of controlling vibration of an operation surface of a touch sensor in the input device according to the embodiment.

FIG. 10 is a diagram for illustrating a method of controlling vibration of operation surface 24 of touch sensor 16 in input device 2 according to the embodiment. As illustrated in (a) in FIG. 10, in input device 2 according to the embodiment, when vibration of operation surface 24 of touch sensor 16 is not controlled, the sliding speed of operation finger 22 increases rapidly, then decreases at time to, and after that gradually decreases as with the input device according to the comparison example.

When the sliding speed of operation finger 22 increases, i.e., operation finger 22 moves on operation surface 24 with acceleration, controller 26 controls vibration element 20 such that the magnitude of vibration of operation surface 24 of touch sensor 16 is decreased to a relatively low level. With this, friction between operation finger 22 and operation surface 24 is increased to a relatively high level.

In contrast, when the sliding speed of operation finger 22 decreases, i.e., operation finger 22 moves on operation surface 24 with deceleration, controller 26 controls vibration element 20 such that the magnitude of vibration of operation surface 24 of touch sensor 16 is increased to a relatively high level. With this, friction between operation finger 22 and operation surface 24 is decreased to a relatively low level.

With this, in input device 2 according to the embodiment, friction between operation finger 22 and operation surface 24 can be controlled to follow change in the moving speed of operation finger 22 during the hesitating motion. As a result, the change over time in sliding speed becomes as indicated by the solid line illustrated in (b) in FIG. 10, operability can be enhanced and operation time can be reduced.

OTHER VARIATIONS

The input device according to one or more aspects have been described above based on the above embodiment, but the present disclosure should not be limited to the embodiment. Various modifications of the present embodiment as well as embodiments resulting from combinations of structural components of the different embodiments that may be conceived by those skilled in the art may be included within the scope of the one or more aspects as long as these do not depart from the essence of the present disclosure.

In the embodiment, input device 2 includes display 6 and touchpad 8, but the present disclosure should not be limited to this example. Input device 2 may be a touch panel in which display 6 and touch sensor 16 are integrated together as a single device.

Note that in the above embodiment, each structural component may be configured as dedicated hardware or achieved by executing a software program suitable for each of the structural components. Each structural component may be achieved as a result of a program executer such as a central processing unit (CPU) or processor reading and executing a software program stored on a storage medium, such as a hard disk or semiconductor memory.

Moreover, part or all of the functions of the input device according to the above embodiment may be achieved by a processor such as a CPU executing a program.

Part or all of the structural components included in each device described above may be configured as an integrated circuit (IC) card or a single module that is detachably attached to each device. The IC card or the module is a computer system that includes a microprocessor, a read only memory (ROM), a random access memory (RAM), and so forth. The IC card or the module may include super-multifunctional large scale integration (LSI). The microprocessor operating in accordance with a computer program enables the IC card or the module to achieve its function. Such IC card or module may be tamper resistant.

The present disclosure may also be the methods described above. The present disclosure may also be a computer program that enables such methods to be achieved by a computer, or a digital signal including the computer program. The present disclosure may also be achieved as the computer program or a digital signal recorded on a non-transitory computer readable recording medium such as a flexible disk, a hard disk, a CD-ROM, a magneto-optical (MO) disc, a digital versatile disc (DVD), a DVD-ROM, a DVD-RAM, a Blu-ray (registered trademark) disc (BD), and a semiconductor memory. The present disclosure may also be the digital signal recorded in such recording medium. The present disclosure may also transmit the computer program or the digital signal via, for example, a telecommunication line, a wireless or wired communication line, a network represented by the Internet, and data broadcasting. The present disclosure may also be a computer system that includes a microprocessor and memory, in which the memory may store the computer program and the microprocessor may operate in accordance with the computer program. The present disclosure may also be achieved by transmitting the program or the digital signal recorded on the recording medium or by transmitting the program or the digital signal via, for example, the network, thereby enabling another independent computer system to carry out the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent application including specification, drawings and claims are incorporated herein by reference in its entirety: Japanese Patent Application No. 2020-210090 filed on Dec. 18, 2020.

INDUSTRIAL APPLICABILITY

The present disclosure is applicable as an input device or the like that vibrates an operation surface of a touch sensor by a vibration element.

The invention claimed is:

1. An input device comprising:
a touch sensor that detects a position of a touch on an operation surface by an operation body;
a vibration element that vibrates the operation surface; and
a controller that changes a magnitude of vibration of the operation surface by the vibration element according to acceleration in movement of the operation body along the operation surface, the movement being performed while the operation body is touching the operation surface.

2. The input device according to claim 1,
wherein the controller calculates the acceleration in movement of the operation body, based on a result of detection by the touch sensor.

3. The input device according to claim 2,
wherein the controller:
calculates the acceleration in movement of the operation body using change in the position of the touch per unit time, the position of the touch being detected by the touch sensor; and
applies a driving voltage to the vibration element to decrease the magnitude of vibration of the operation surface by the vibration element as the acceleration in movement calculated increases.

4. The input device according to claim 3,
wherein the controller:
determines, using a first relation, a driving voltage corresponding to the acceleration in movement calculated, the first relation being a relation in which the driving voltage to be applied to the vibration element decreases at a constant rate relative to increase in the acceleration in movement; and
applies the driving voltage determined to the vibration element.

5. The input device according to claim 3,
wherein the controller:
determines, using a second relation, a driving voltage corresponding to the acceleration in movement calculated, the second relation being a relation in which the driving voltage to be applied to the vibration element decreases at a rate that decreases as the acceleration in movement increases; and
applies the driving voltage determined to the vibration element.

6. The input device according to claim 3,
wherein the controller:
calculates a moving speed of the operation body based on the change in the position of the touch per unit time, the position of the touch being detected by the touch sensor; and
calculates the acceleration in movement based on change per unit time in the moving speed calculated.

7. The input device according to claim 6,
wherein when the moving speed calculated is greater than a threshold, the controller applies the driving voltage to the vibration element to decrease the magnitude of vibration of the operation surface by the vibration element as the acceleration in movement calculated increases.

8. The input device according to claim 7,
wherein when the moving speed calculated is less than or equal to the threshold, the controller stops driving the vibration element.

9. The input device according to claim 1, further comprising:
a display that displays content that is input to the touch sensor by the operation body.

\* \* \* \* \*